(12) United States Patent
Sullivan et al.

(10) Patent No.: US 7,195,473 B2
(45) Date of Patent: Mar. 27, 2007

(54) RAILROAD TIE AND METHOD FOR MAKING SAME

(75) Inventors: Henry W. Sullivan, Houston, TX (US); Gregory P. Krouse, Seabrook, TX (US); William J. Krygsman, Tillsonburg (CA)

(73) Assignees: TieTek, Inc., Houston, TX (US); North American Technologies Group, Inc., Houston, TX (US)

( * ) Notice: Subject to any disclaimer, the term of this patent is extended or adjusted under 35 U.S.C. 154(b) by 0 days.

(21) Appl. No.: 10/808,955

(22) Filed: Mar. 25, 2004

(65) Prior Publication Data

US 2004/0175452 A1 Sep. 9, 2004

Related U.S. Application Data

(62) Division of application No. 09/800,171, filed on Mar. 5, 2001, now Pat. No. 6,828,372.

(51) Int. Cl.
*B29C 45/23* (2006.01)

(52) U.S. Cl. ............... 425/140; 425/141; 425/558; 425/575; 425/256; 425/146; 425/147; 249/136; 249/141; 249/155; 249/158

(58) Field of Classification Search ............. 425/140, 425/141, 558, 577, 556, 444, 575, 256, 259, 425/145, 146, 572, 147; 264/323, 328.7; 249/136, 139, 141, 155, 158
See application file for complete search history.

(56) References Cited

U.S. PATENT DOCUMENTS

| | | | | |
|---|---|---|---|---|
| 3,477,101 A | * | 11/1969 | Fritsch | 425/150 |
| 4,318,877 A | * | 3/1982 | Smith | 264/107 |
| 4,626,189 A | * | 12/1986 | Hammer et al. | 425/146 |
| 5,082,604 A | * | 1/1992 | Valyi | 264/40.5 |
| 5,370,518 A | * | 12/1994 | Sasaki et al. | 425/147 |
| 5,380,184 A | * | 1/1995 | Von Holdt, Sr. | 425/547 |
| 5,732,858 A | * | 3/1998 | Plastino | 223/12 |
| 5,916,503 A | * | 6/1999 | Rettenbacher | 264/45.3 |

* cited by examiner

*Primary Examiner*—Joseph S. Del Sole
(74) *Attorney, Agent, or Firm*—The Matthews Firm

(57) ABSTRACT

Thermoplastic polymers, rubbery polymeric components and reinforcing fillers are mixed and heated to a range of 380° F. to 440° F. The resulting mixture is then fed into a BANBURY mixer, with the resulting mixture fed into a diverter feeding two molds. The velocity of the piston of each mold being filled is controlled to thereby control the density of the molded product along its length (BANBURY is a registered trademark of Farrel Corporation). As each mold is filled, it is deposited in a cool water bath (50° F.–60° F.) while the next mold is being filled. The molds are sequentially transferred to an air cooling rack to complete the process. A texture, generally comprising indentations perpendicular to the longitudinal axis on the molded object, provides a frictional surface between the railway crosstie and the ballast beneath the crosstie.

9 Claims, 10 Drawing Sheets

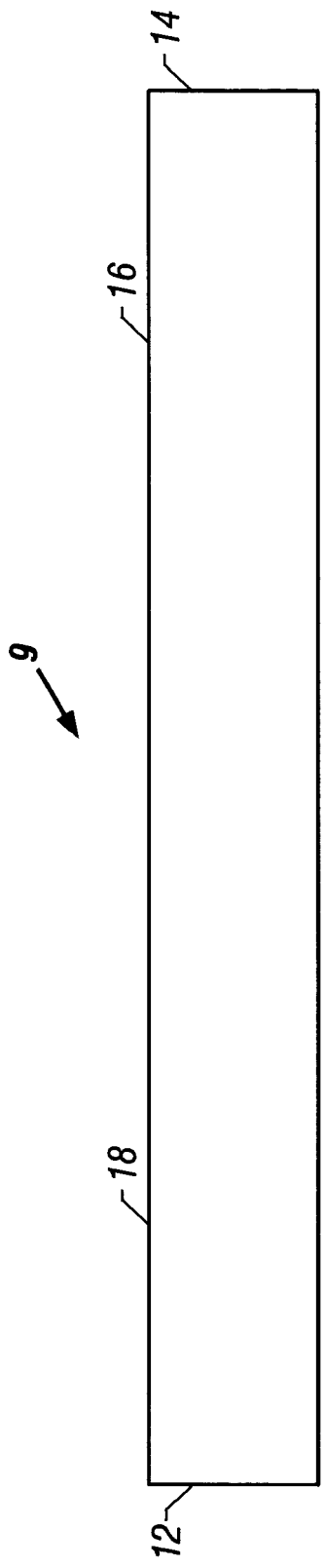
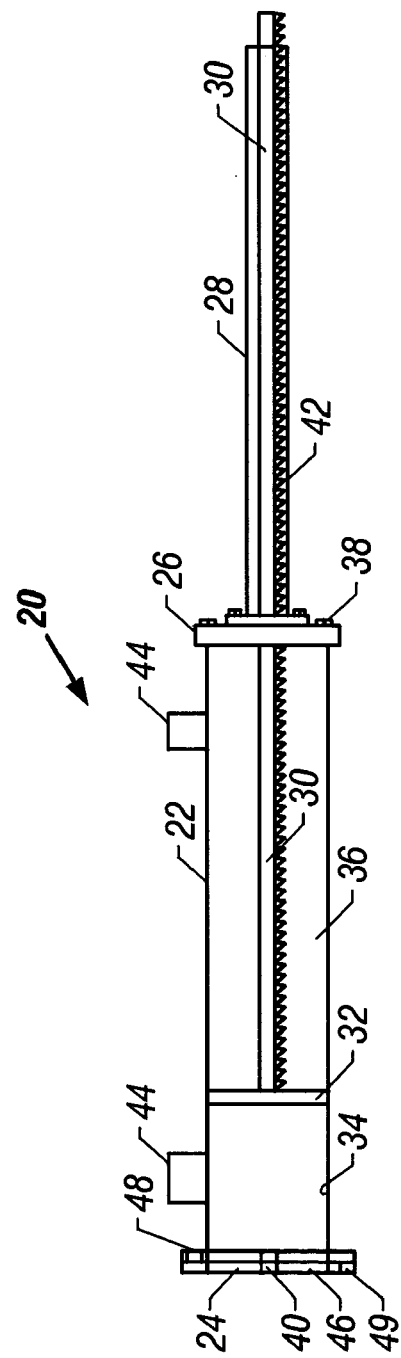

RAILROAD TIE AND METHOD FOR MAKING SAME

RELATED APPLICATIONS

This is a Divisional of U.S. application Ser. No. 09/800,171 filed on Mar. 5, 2001, and now U.S. Pat. No. 6,828,372 B2.

BACKGROUND ON THE INVENTION

This invention relates, generally, to molded products made from thermo plastic materials, and specifically, to composite railroad ties and methods for making same. The invention relates more specifically to new and improved railroad ties which will last longer in hot, humid environments and to methods for making such railroad ties.

PRIOR ART

It is well known to make railroad ties from thermoplastic materials, for example, as described in U.S. Pat. No. 5,799,870 to John C. Bayer.

It is also known to make railway ties from sand and recycled thermoplastic containers, for example, as described in U.S. Pat. No. 5,055,350 to Charles W. Neefe.

It is also well known to make railroad ties from recycled tire fragments, for example as described in U.S. Pat. No. 5,238,734.

Moreover, it is well known to make porous flexible pipes from thermoplastic materials and thermoset materials, for example, as described in U.S. Pat. No. 5,366,365 to Henry W. Sullivan, et al.

It is also well known to make sheet products from thermoplastic material combined with granular scrap material, for example, old automobile tires, as described in U.S. Pat. No. 4,970,043 to Rosetta C. Doan, as well as in U.S. Pat. No. 5,733,943, also to Rosetta C. Doan.

Moreover it is known to make railroad ties from combinations of polymeric components combined with a rubbery polymeric component obtained from disposed tires, such as is described in U.S. Pat. No. 5,886,078 to Henry W. Sullivan, et al.

In addition, it is known to make elongated cylindrical molds having an internal sliding piston which allows the molten plastic to be introduced into the mold which produces an elongated plastic body having the tube imbedded therein.

The prior art also includes U.S. Pat. No. 4,824,627 to Floyd V. Hammer, and U.S. Pat. No. 4,191,522 to James E. Turner which relate to various molded plastic products and extruding machines for manufacturing extruded products.

The prior art also includes U.S. Pat. No. 5,507,473 to Floyd V. Hammer et al; U.S. Pat. No. 4,028,288 to James E. Turner and U.S. Pat. No. 5,951,712 to Jerome Campbell.

A common element running through most if not all of the above referenced prior art patents is the use of using shredded rubber products in the finished product, such as used automobile and truck tires.

However, the prior art taken individually and in combination fails to provide the solution to manufacturing processes for making reliable railroad ties, or to the composition of the railroad ties themselves.

Specifically, the prior art fails to provide methods or apparatus which have the time efficiencies necessary to manufacture and supply railroad ties to the railroad industry.

OBJECTS OF THE INVENTION

It is therefore the primary object of the present invention, generally, to provide new and improved molded products made from thermoplastic materials, and specifically, to provide new and improved rail road ties, and to methods for making the same.

BRIEF DESCRIPTION OF THE DRAWINGS

Referring now to FIG. 1, there is illustrated a top plan view of an extruded rail road tie fabricated in accordance with the present invention.

FIG. 2 illustrates a diagramatic view of one of the molds used in accordance with the present invention;

DETAILED DESCRIPTION OF THE PREFERRED EMBODIMENT OF THE PRESENT INVENTION

Figure 3:
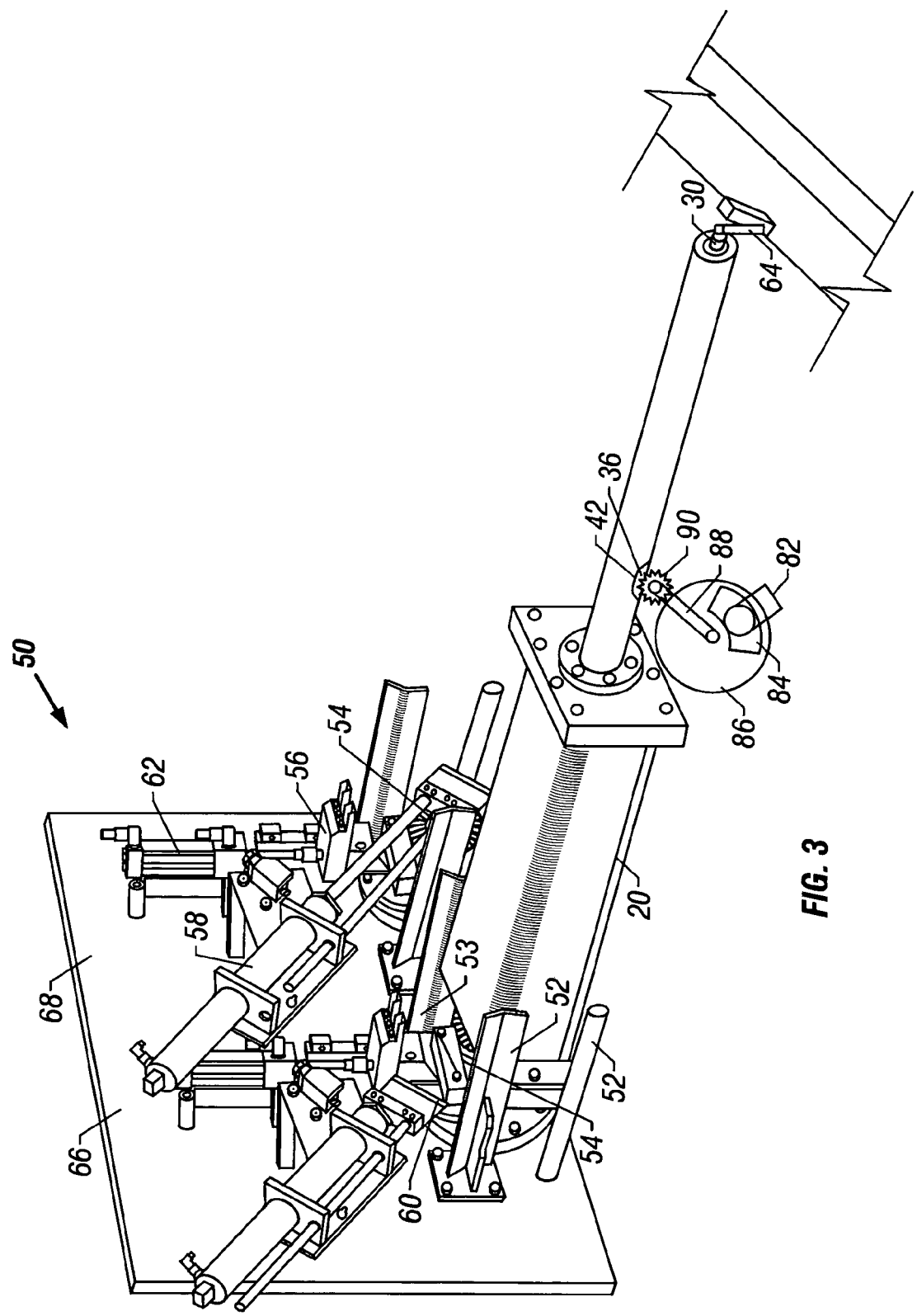
FIG. 3 illustrates, in somewhat more detail, the mold according to FIG. 2 but having in addition thereto a diverter for allowing the extruded materials to be diverted from one mold to the other in accordance with the present invention.

In the drawings, similar reference characters denote similar elements throughout the several views. Referring now to FIG. 1, a top plan view, the present invention comprises, an extruded object 9, for example, a railroad tie which typically measures between 8.5 and 9.0 feet long, and having a side 16, first end 12 and a second end 14.

In the preferred embodiment, the extruded object 9, having a side 16, a first end 12 and a second end 14 are comprised of waste thermoplastic, rubbery materials and strengthening materials, each comprising from about 4–55% of the composite mixture, as described hereinafter in more detail with respect to FIG. 6.

In FIG. 2, mold 20 has a mold sidewall 22, a first mold end 24, a second mold end 26, a rod housing 28, a rod 30, a piston 32, a mold inner surface 34, an elongated, toothed plate 36, a plurality of bolts 38, an input port 40 and an external access port 42.

Input port 40 is located in the first mold end 24. The input port 40 releasably attaches to the diverter valve 76 illustrated in FIG. 4. The piston 32 in FIG. 2 is affixed to an end of rod 30. Piston 32 movably seals mold inner surface 34. The toothed plate 36 extends the length of rod 30 and is affixed, preferably, to the lower surface of the rod 30. Rod housing 28 has an external access port 42 for accessing the elongated, toothed plate 36 affixed to the rod 30.

A pair of attachment (lifting) handles 44 are located on or near the top surface of the mold 20 and may take any number of forms. For example, the handles 44 may be U-shaped, and the opening in each such handle may be transverse to the longitudinal axis of the mold 20, or the opening in each such handle may be co-axial with a line parallel to the longitudinal axis of the mold 20. When the mold 20 is totally filled with the extruded material, a pair of hoisting units (not shown) are connected to the handles 44, respectively and the mold 20 is first lifted vertically, for example, 1–2 feet. The hoist units are then moved horizontally to place mold 20 wherever desired, for example, over and into the cold water bath described hereinafter, by releasing each hoist unit from each of the handles 44, respectively. Preferably, each such release is accomplished by pneumatic pressure to remove the hoist unit from the interior of the respective handle 44.

Figure 4:
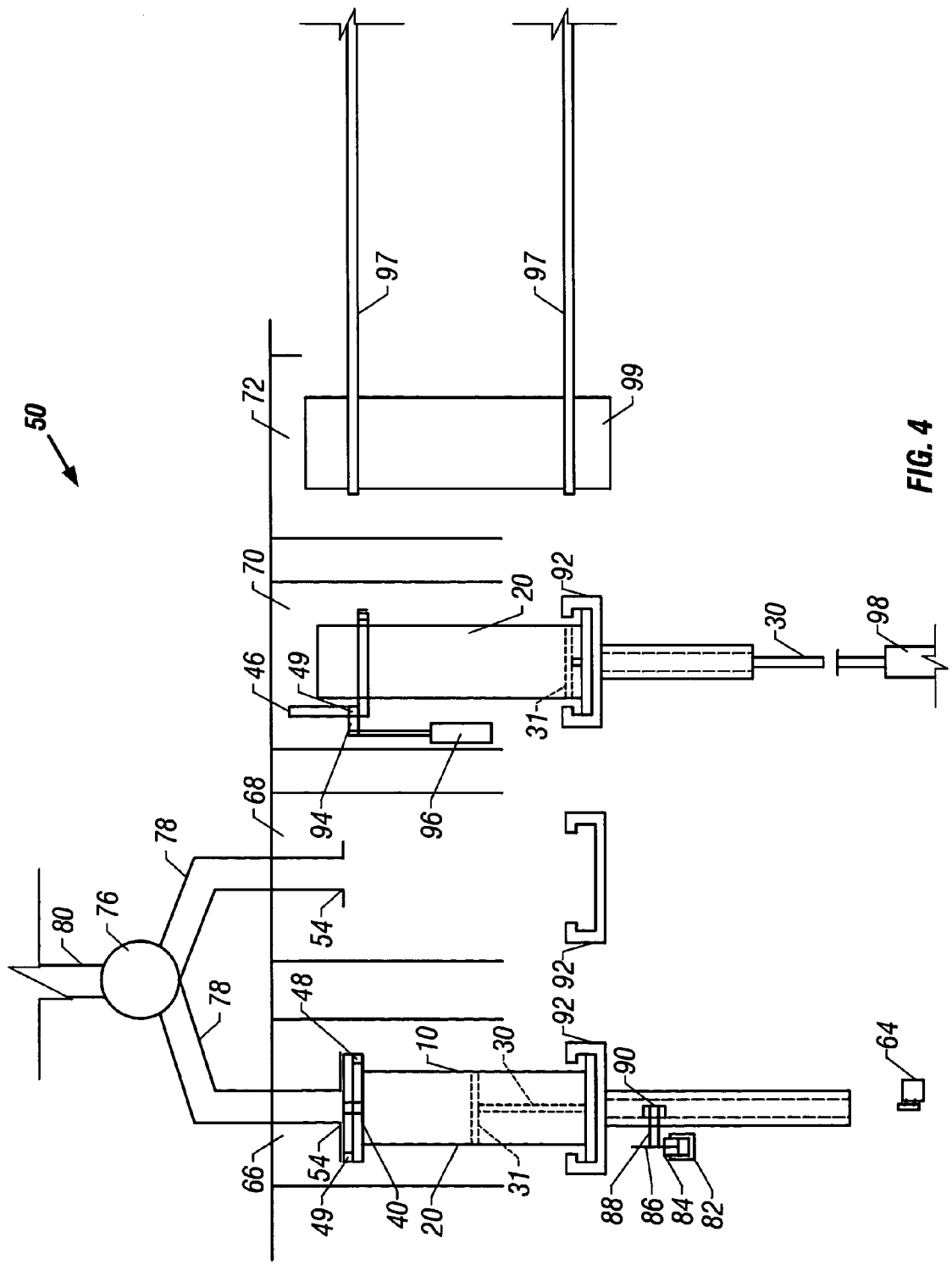
FIG. 4 illustrates diagramatically the use of a diverter placed between two molds to be filled with extruded materials in accordance with the principles of the present invention.

In FIG. 3, mold 20 is positioned in diverter 50, by guide arms 52, and is locked into first station 66 of FIG. 4, at mold injector 54, by mold lock 56. Mold lock is actuated by pneumatic cylinder 62. When mold 20 is full, rod 30 actuates switch 64, causing diverter 50 to switch from causing the thermoplastic mixture to flow into the first mold at position 1 to a second, identical mold at position 2. After mold 20 is filled, mold cutoff 60 is actuated by pneumatic piston 58.

In FIG. 2, input port 40, is located in the first mold end 24, input port 40 is sealably positioned at mold injector 54 as shown in FIG. 3, piston 32 is affixed to an end of rod 30, piston 32 movably seals mold inner surface 34, toothed plate 36 extends the length of rod 30 and is affixed to the lower surface of the rod 30, rod housing 28 has an external access port 42 for accessing the toothed plate 36 affixed to the rod 30.

In FIG. 3, there is illustrated a mold 20, a rod 30, a piston 32, a toothed plate 36, a toothed plate access port 42, a diverter 50, guide arms 52, a mold input port door 53, a mold injector 54, a mold input port opener/closer 56, a pneumatic piston 58, a mixture overflow cutoff 60, a mold input door actuating unit 62, a sensor 64, a diverter station one (66), a diverter station two (68), a caliper 82, a brake pad 84, a disc 86, a connecting rod 88 and a gear 90 positioned to mesh with the toothed plate 36.

In FIG. 3, mold 20 is positioned in diverter 50, at station one (66). Positioning is facilitated by guide arms 52, and is locked into first station (66), at mold injector 54, by mold port opener/closer 56. Mold input port door 53 is actuated by mold input door actuating unit 62, as mold 20 is filled by mixture being forced into mold 20 through mold injector 54. Mixture contacts plate 31, shown in FIG. 4, as piston 31 is forced through and along the length of mold 20. Rod 30 is forced to move out of the mold 20, as toothed plate 36 is fixedly attached to rod 30. Gear 90 contacts toothed plate 36 through toothed plate access port 42. Rod 30 and toothed plate 36 are forced past gear 90 which is in contact with plate 36. Gear 90 is forced to rotate. As gear 90 rotates, connecting rod 88, fixedly attached to gear 90, is also forced to rotate. As connecting rod 88 rotates, disc 86, fixedly attached to connecting rod 88, is forced to rotate. Frictional force to resist the rotation of disc 86 is applied to disc 86 through brake pad 84 by caliper 82. As mold 20 reaches capacity, rod 30 actuates sensor 64, causing diverter valve 76, shown in FIG. 4, to stop the thermoplastic mixture flowing into the mold 10 at filling station one (66), and to begin to flow into the mold 20 positioned at filling station two (68), after mold 20 is mixture overflow cutoff 60 is actuated by pneumatic piston 58. Mold input port opener/closer 56 closes mold input port door 53. Mold 20 is removed from filling station one (66). Mixture overflow in mold injector 54 is removed by mixture overflow cutoff 60.

In the operation of the gear 90 and toothed plate 36 assembly, the density of the material in a given mold is varied, or made constant by controlling the braking mechanism comprised of the brake pad 84 against the disc 86. Because the effective length of the mold increases as the piston 32 is pushed through the mold, the density of the molded material will decrease as a function of the distance through which the piston 32 moves, assuming a constant velocity of the piston 32.

If a uniform density of the molded product is desired, the velocity of the piston can be continuously decreased by applying brake pressure at a continuously increasing rate. The brake can be applied manually (by hand or foot), or can be applied through the use of a programmed computer in conjunction with a mechanical arm or lever.

Likewise, if various combinations of density are desired along the length of the molded product, the brake pressure can be varied to achieve such a result. As but one example, a railway cross tie can be made to have a uniform density along its length, or the product can have a relatively high density at its two end portions and a lower density in its middle portion, or any combination desired merely by controlling the braking sequence with the gear 90 and the toothed plate 36, as determined by the application of the brake pad 84 to the disc 86.

In FIG. 4, diverter valve 76, activated by switch 64 of FIG. 3, switches from causing the thermoplastic mixture to flow through the piping 78 and out through the mold injectors 54 in first to the mold injectors 54, station 66, in second station 68.

Figure 5:
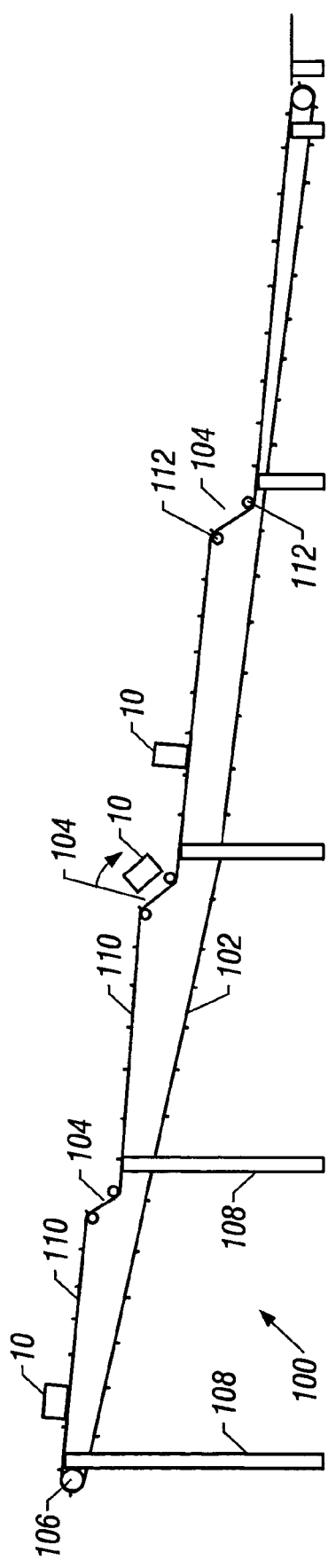
FIG. 5 illustrates diagramatically a cooling table which is used to cool the extruded rail road ties as a part of the manufacturing process in accordance with the present invention.

In FIG. 5, cooling table 100, table surface 110, support members 108, conveyer 102, large conveyer rollers 106, small conveyer rollers 112 and table dropoff 104 provide an apparatus for the air cooling of the extruded product 10.

In FIG. 5, table surface 110 is supported by support members 108. Table dropoff 104 is formed by one section of the table surface 110 being vertically offset (lower) in relation to the preceding section of the table 100 as the conveyer 102 travels across the table 100. Dropoff 104 is arranged such that as an object passes over dropoff 104 the object will turn from one side to another side as it drops from one section of the table surface 110 to another vertically offset section of the table surface 110. Conveyer 102 is directed along the table surface 110 by large conveyer rollers 106 with additional guidance past table dropoffs 104 by the small conveyer rollers 112.

Figure 6:
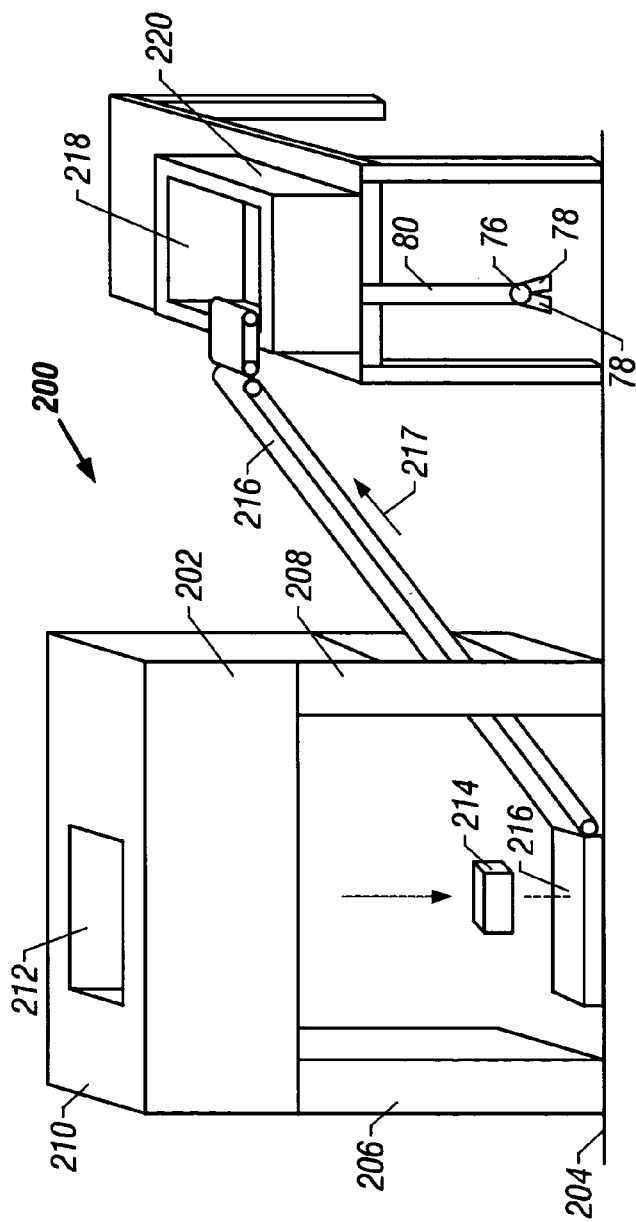
FIG. 6 illustrates a system in accordance with the present invention which can be used to mix the materials which will be found in the finished product and which will be used to feed the extrusion system in accordance with the present invention.

Referring now to FIG. 6, there is illustrated an isometric, pictorial view of a system 200 for mixing and feeding the materials to the extrusion molds in accordance with the present invention.

The system 200 includes a housing 202 supported above the floor 204 by a plurality of legs, which may include the two legs 206 and 208, and which may include four or more legs. The housing 202 includes a flooring 210 upon which workman may walk to facilitate loading the beginning materials into the opening 212.

It should be appreciated that the preferred embodiment of the present invention contemplates that the composite material which makes up the railroad ties in accordance with the invention requires that the product be able to withstand high temperatures, high humidity and the weight of the railroad passing along the rails which are mounted on such railroad ties. The preferred embodiment of the composite railroad tie has the following components:

A mixture of
   from about 4% to about 55% of a thermoplastic polymer,
   from about 4% to about 55% of a rubbery polymeric component; and,
   from about 4% to about 55% of a reinforcing filler.

The process for forming a new product can be accomplished by mixing:
   from about 4% to about 55% of a thermoplastic polymer,
   from about 4% to about 55% of a rubbery polymeric component; and,
   from about 4% to about 55% of a reinforcing filler;

Preferably, the thermoplastic polymer is comprised of at least one of the materials selected from the group of materials consisting essentially of recycled polyolefins, recycled bucket resin, recycled drum resin, densified film, recycled grocery bags, electric wire coating, and recycled bottle resin or any combination thereof.

Moreover, the rubbery component is preferably comprised of at least one of the materials selected from the group of materials consisting essentially of crumb rubber, automotive fluff, tire belt fluff, carpet backing, rubber backing and recycled circuit boards or any combination thereof.

Finally, the reinforcing filler is preferably comprised of at least one of the materials selected from the group of materials consisting essentially of carbon black, fly ash, mica, fiberglass, arregonite, crushed concrete, sand and crushed glass or any combination thereof.

In combination the materials each comprise from about 4% to 55% of the mixture. Also, in combination, the thermoplastic polymer and rubbery components comprise at least 20% of the mixture.

A mixing compartment (not illustrated) is located within the housing 202 in FIG. 6 to receive the materials through the opening 212. The mixing compartment contains various combinations, as needed, of rollers, stirring paddles, heaters, etc. to ensure the melting of the materials, as well as the mixing of such materials. The finished product designed to exit the mixing compartment and the housing 202 typically has a desired temperature in the range of 380° F.–440° F., preferably a temperature of 405° F. It should be appreciated that by the use of pressure and friction, the temperature of the mixture can be maintained in this desirable range, but if desired, the temperature can also be maintained through the use of an auxiliary heater.

When the materials have been thoroughly mixed and heated as desired, a trap door (not illustrated) is opened, and the bulk material 214, resembling a bale of hay in size and structure, is dropped onto a conveyor belt 216, a belt traveling up the sloped ramp as defined by the conveyor belt and the arrow 217. Upon reaching the top of the conveyor belt 216, the batch of mixed material 214 is dumped through the opening 218 into the housing 220.

The housing 220 contains a conventional BANBURY mixer. The mixing of rubber stock and the mixing of plastic stock in BANBURY mixers is quite well known by those skilled in the art. The BANBURY mixer is named for its inventor, Mr. Banbury. A typical BANBURY mixer is a large, internal mixer, similar to a doughnut mixer, with two rotors revolving in opposite directions and at different speeds in a water-cooled chamber. Various chemicals and materials are added to the BANBURY mixer through a conveyor at the top of the machine, to mix up a batch of stock (BANBURY is a registered trademark of Farrel Corporation).

In mixing a batch of stock in a BANBURY mixer, the materials are forced between the rotors, and also between the walls of the BANBURY and the rotors, by a lid operated by a hydraulic ram (BANBURY is a registered trademark of Farrel Corporation). While the heat caused by the pressure of the hydraulic ram and by friction tends to maintain the temperature of the mixed material in the desired range of 380° F.–440° F., one or more heaters can be added to the system as desired.

Once a batch of material has been mixed in the BANBURY mixer located in the housing 220, a door is opened at the bottom of the mixer to allow the material to enter the piping 80 and the diverter 76, also illustrated in FIG. 4 (BANBURY is a registered trademark of Farrel Corporation).

A BANBURY mixer has been described in the literature as being a batch-type mixing machine named after its inventor which has been widely used in the rubber industry since 1920 for high-volume production (BANBURY is a registered trademark of Farrel Corporation). It will also accept plastic molding powders. Its chief feature is an enclosed barrel-shaped chamber in which two rotors with oppositely curved contours rotate rapidly on a horizontal axis, first masticating the rubber and then efficiently incorporating the dry ingredients. Both steam and water jacketing are provided. Batches may be up to 1000 lb. A plunger at the entrance port rides on top of the batch to furnish enough pressure for proper mixing. A hydraulically operated discharge gate is located below the mixing chamber.

Although the system of FIG. 6 contemplates dropping the bale 214 of material from the mixer system 200 onto its conveyor belt 216 to transport the bale 214 to the BANBURY mixer in housing 220, an alternative embodiment would have the BANBURY mixer located below the trap door of the housing 202 to allow the bale 214 to drop into the opening 218 and eliminate the need for the conveyor belt 216. (BANBURY is a registered trademark of Farrel Corporation). Thus, alternative embodiments of the system 200 will by obvious to those skilled in the art, following a reading of this specification and its accompanying drawings.

Figure 7:
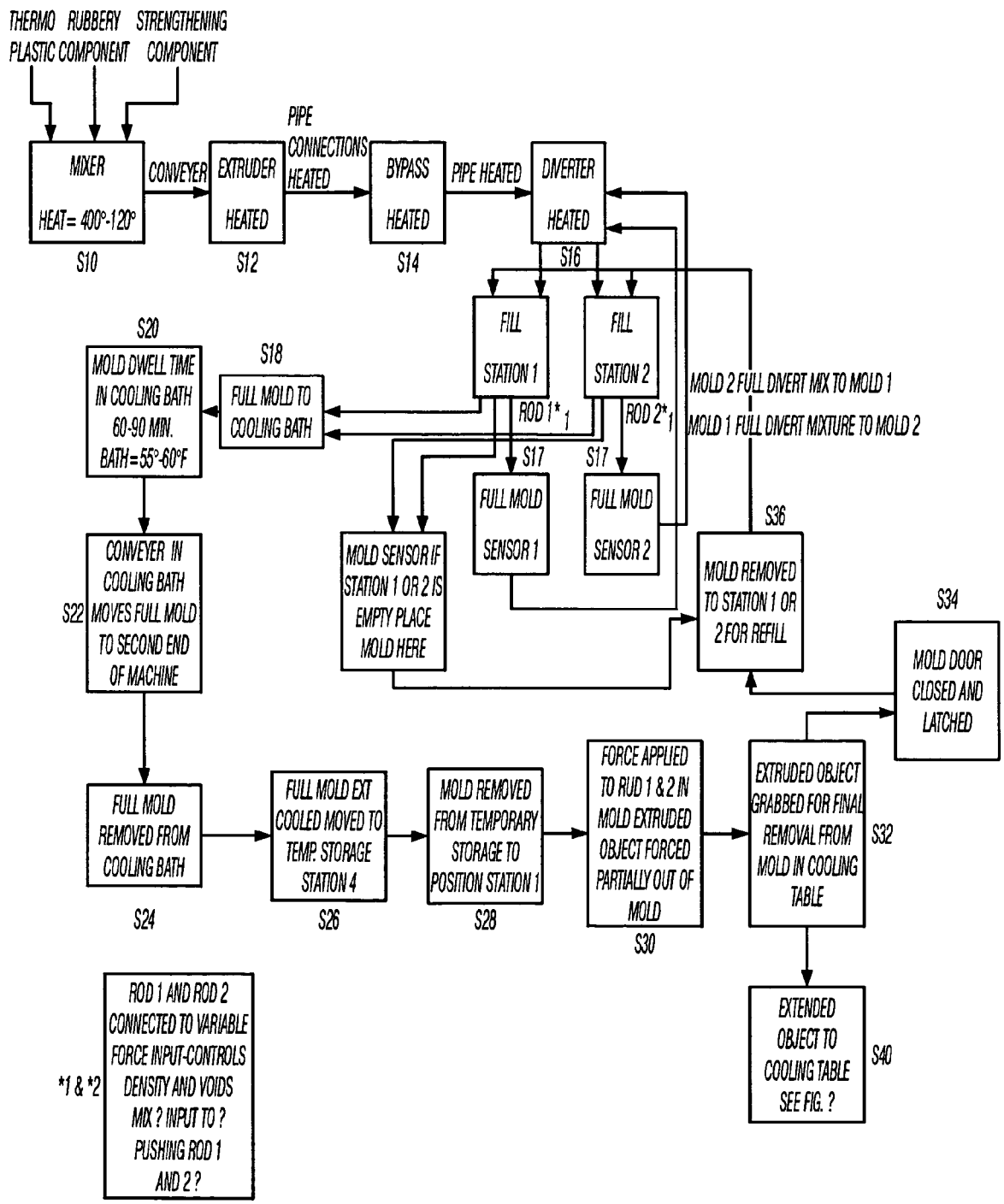
FIGS. 7, 7a and 8 illustrate flow charts showing the process according to the invention for molding, externally cooling and extracting the extruded rail road ties in accordance with the present invention.

In FIG. 7, is a flowchart showing the process for molding, externally cooling and extracting a mixture to become an extruded object. S10 is the mixing step where the thermoplastic, rubber and strengtheners are combined and mixed. The mixing process through pressure and friction heats the combination to a range of 380 Fahrenheit to 440 degrees Fahrenheit, preferably to 405 degrees Fahrenheit. A conveyer carries the mixture from S10 to S12. In S12 the mixture is put into an extruder to further mix the mixture and force the mixture into a mold. From S12 the mixture is forced through a heated pipe into S14. S14 is a bypass valve from which the mixture may be removed from the process in the event of any unforeseen circumstances. From S14 the mixture flows through a heated pipe to S16. S16 is a diverter, which has a full mold sensor, S17, to detect when the mold in either fill station 1 or fill station 2 is full. When the mold in fill station 1 or 2 is full, S16, the diverter, directs a valve to shut off the flow of material from the full mold in either fill station 1 or 2 and direct the flow of the mixture into the empty mold in the adjacent fill station. Once a mold is full the mold is removed from either fill station 1 or 2 and placed in S 18, the cooling bath. S18, the cooling bath is preferably maintained at from about 50 degrees F. to about 60 degrees F. At S22 the mold is transported from one end of the bath to the other, transit time being at least 30 minutes to allow the exterior of the mixture to cool to facilitate removal from the mold. At S24 the full mold is removed from the cooling bath. At S26 the full mold, externally cooled, is removed to storage at Station 4. At S28 the full mold is removed from storage at station 4 to the extraction station, station 3. At S30, the extraction station, the door latch pin on the mold is pushed up from the bottom allowing the pneumatic door opener to open the door on the mold. Once the door is open pressure is applied to the rod extending from the rear of the mold, pushing the piston inside the mold, in turn pushing the now externally cooled mixture, which has formed an extruded object, partially out of the mold. At S32 the extruded object is grabbed by the grappler for completion of the removal process from the mold. At S34, the mold door is closed by the pneumatic door opener, then the door is relatched. At S36 the mold is held until a full mold has been removed from either fill station 1 or 2 allowing placement of the empty mold from the extraction station into the now empty position. At S40 the extruded object is sent to the cooling table.

Figure 7A:
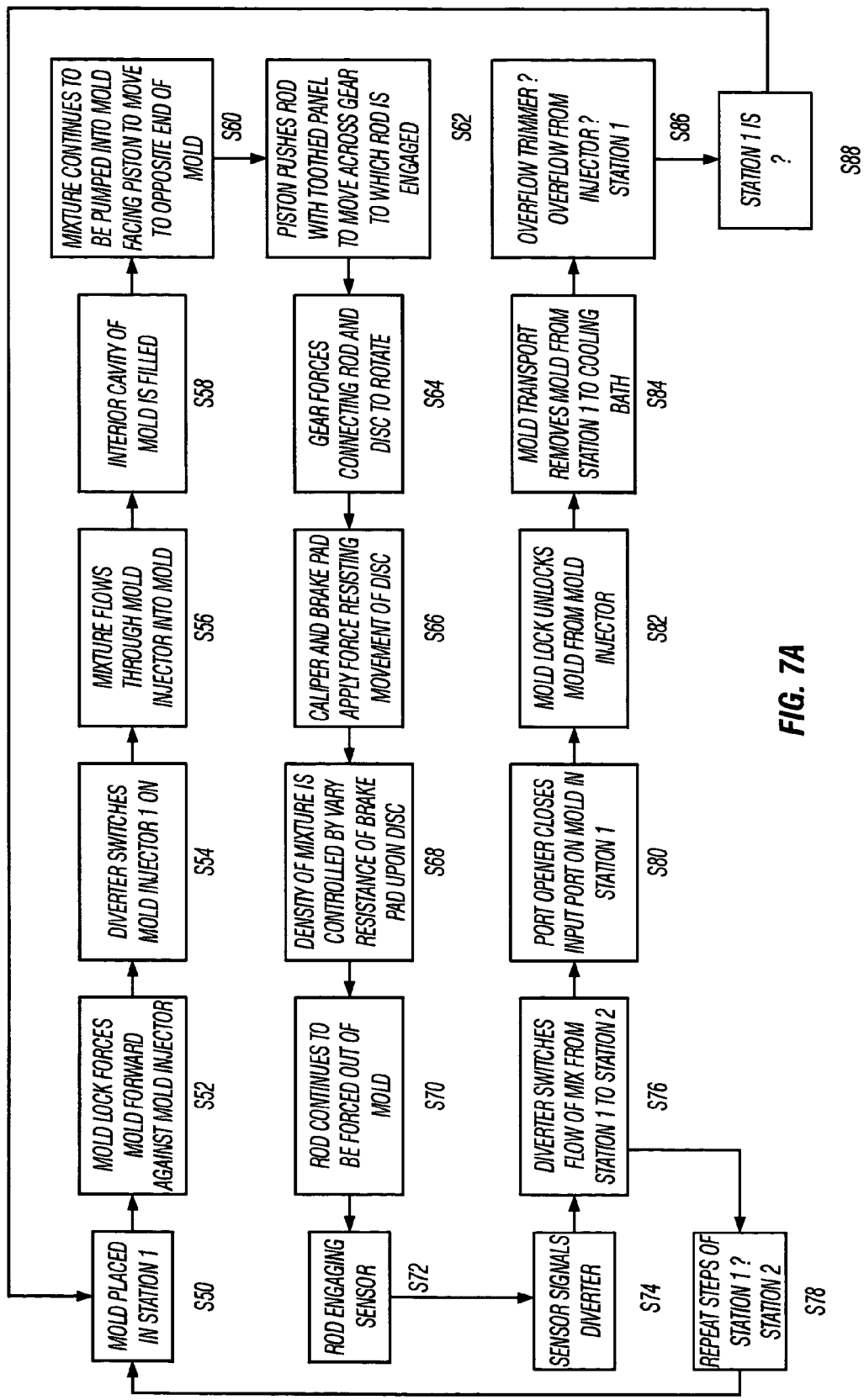

FIG. 7a, is a flowchart showing the filling process that occurs at station one (66), and station two (68). At S50 a mold 10, is placed in station one, mold lock then force the mold against the injector to form a seal between the mold and the injector while the mold injection port is opened by the external opener S52, diverter valve then opens S54, allowing the mixture to flow into the mold S56, piston is full forward against the mold door allowing only a small space to be filled by the mixture S58, before the mixture begins to force the piston away from the mold door S60, piston pushes rod to which is fixedly attached a toothed plate which in turn is engaged to a gear S62, gear turning a connecting rod and a disc S64, disc is restricted by a brake pad through which force is applied by a caliper S66, varying the resistance of the brake pad and disc allows the density of the extruded object being molded to be varied or kept uniform, whichever is desired by the operator S68. As the mixture continues to be pumped into the mold the rod continues to be forced out of the mold S70, until the rod engages sensor S72, sensor signals diverter S74, to move valve from open to station one to closed station one and from closed station two to open station two, S76, all previously recited steps for station one are now repeated at station two, S78, continuing at station one injection port opener closes input port on mold in station one, S80, mold lock unlocks mold in station one, S82, mold transporter removes mold from station one to cooling bath of FIG. 7, S84, overflow trimmer is activated to remove mixture that overflowed when mold was remove from station one, S86, station one is ready for a mold to be moved by mold transporter from extractor station three to station one, S88, all steps repeated at station two.

Figure 8:
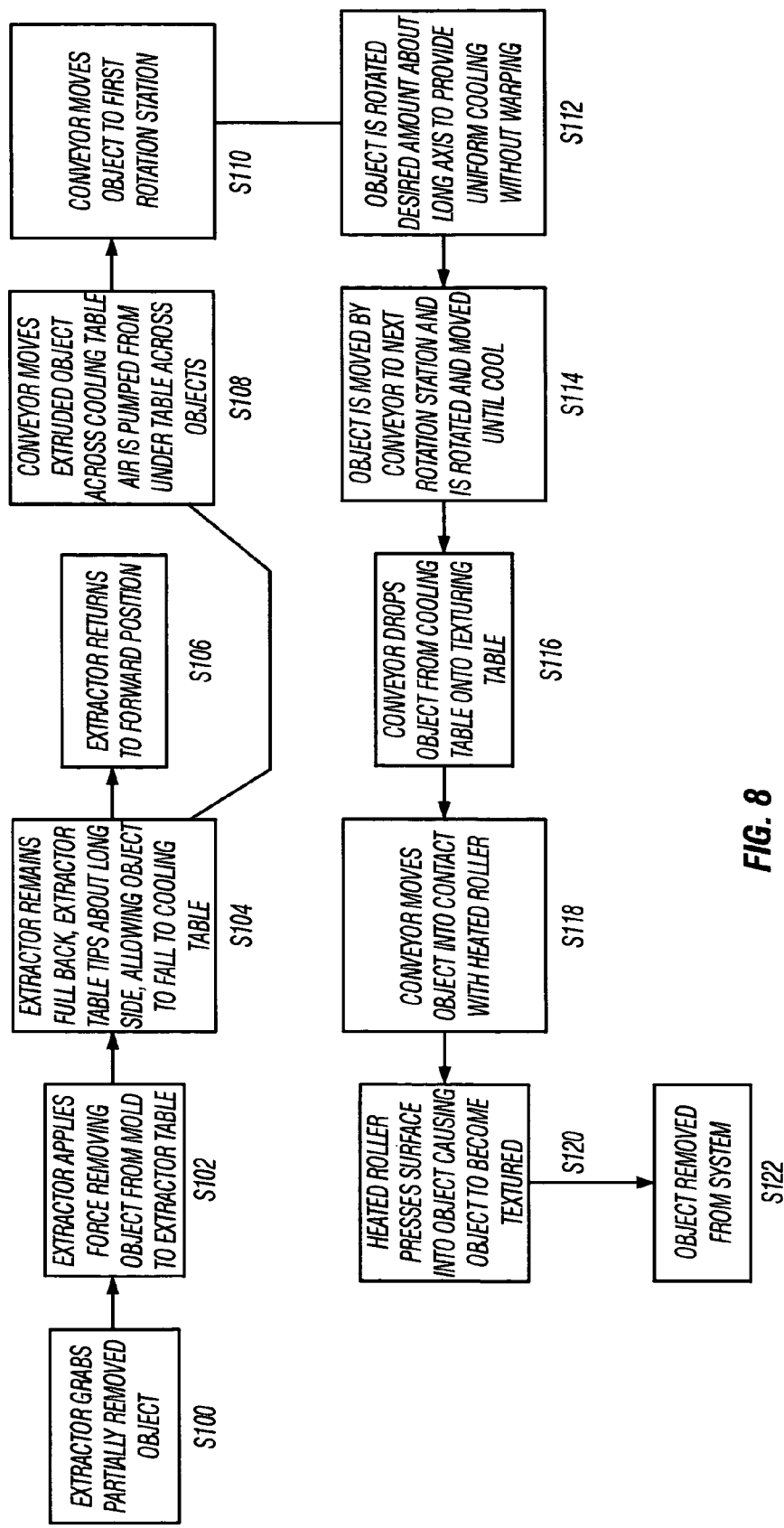

In FIG. 8, is a flowchart of the air cooling process of an extruded object. FIG. 8, S100, is the equivalent of S32 in FIG. 7. At S100 the extractor grabs the extruded object. At S102 the extractor applies force to the extruded object to remove the extruded object from the mold, the more force the extractor applies the tighter the jaws of the extractor grip the extruded object. At S104 the extractor remains in the full back position, the extractor table is forced upwards along a long side by a pneumatic cylinder mounted under the table. The table then pivots on its remaining long side allowing the extruded object to fall off of the extractor table and onto the cooling table below. At S106 the extractor returns to the full forward position to extract the next extruded object. At S108 the conveyer moves the extruded object across the cooling table while air is circulated across the extruded object from under the table. At S110 the extruded object reaches a rotation station. Each rotation station is at a predetermined interval. At S112 the object is conveyed over a short precipice causing the extruded object to rotate as it falls from one side to the next side. The object is rotated to allow the object to cool without warping due to the weight of the extruded object. At S114 the object is moved by the conveyer from one rotation site to the next rotation site if further rotation is needed. At S116 conveyer drops object from cooling table onto texturing table. At S118 texturing conveyer moves extruded object into contact with rollers. Rollers are heated by passing a hot fluid through them. At S120 heated rollers press textured surface onto extruded object causing extruded to become textured. As S122 extruded object is removed from the system.

Figure 11:
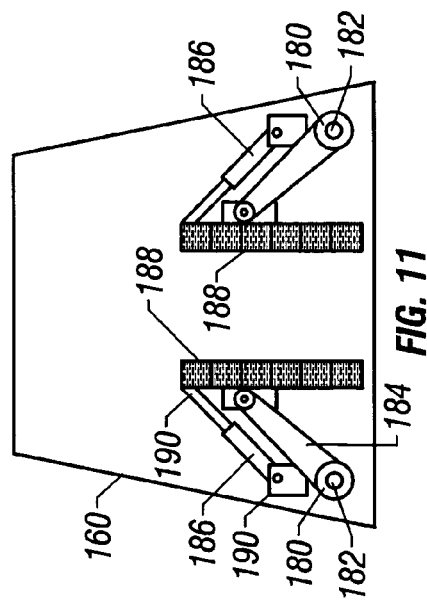
FIGS. 9, 10 and 11 illustrate, diagramatically, the extractor assembly which is used in accordance with the present invention which enables the rail road ties to be extracted from the overall assembly after being cooled in a cold water bath and then be moved into the air cooling process used in accordance with the present invention.
Figure 9:
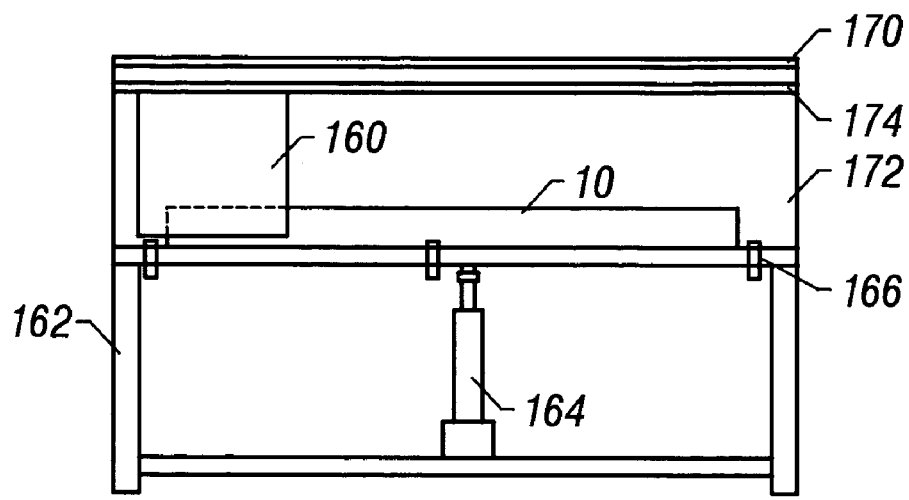
Figure 10:
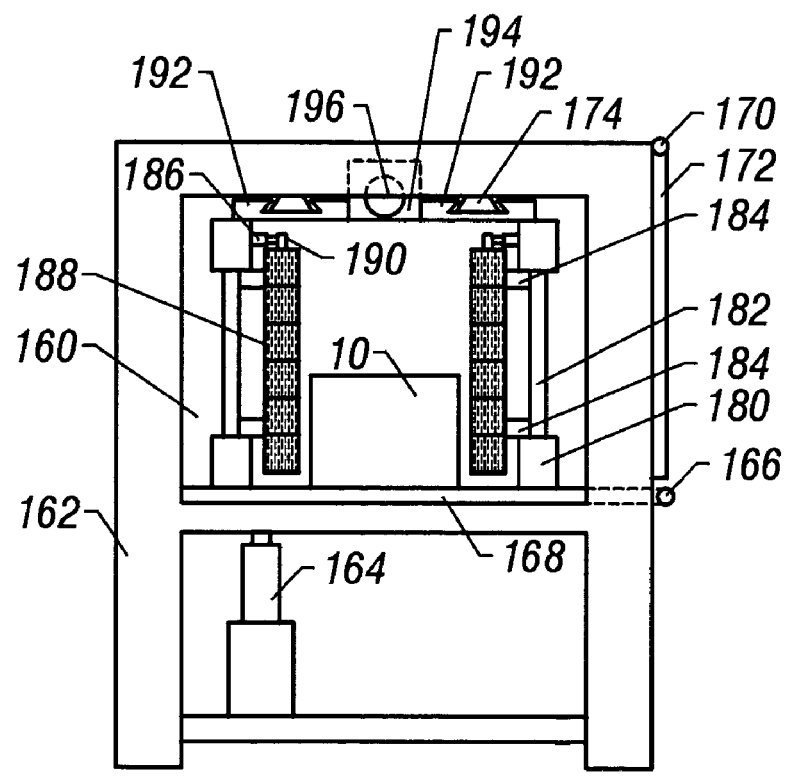

In FIGS. 9, 10 and 11, the extractor assembly is shown. FIG. 9 is a side view of the extractor assembly showing extractor 160, mounted about the extractor table 162, on over head rails 174.

Pneumatic cylinder 164 activates to tilt the bed 168 (not shown) of the extractor table about hinge 166, causing the extruded object 10 to slide toward hinge 166. Extruded object 10 further slides to side of bed with hinge 166 eventually coming into contact with side door 172, causing side door 172 to rotate about hinge 170 allowing extruded object 9 to fall onto cooling table of FIG. 5. FIG. 10 is an end view of the extractor assembly. Extractor 160 is mounted to extractor table 162 using rails 174, and mounting brackets 192. Mounting brackets 192 allow extractor 160 to move along the long axis of extractor table 162. Threaded fitting 194, affixed to extractor 160, is movably affixed to a threaded rod 196. When threaded rod 196 is rotated extractor 160 is caused to move along the long axis of extractor table 162. Extractor jaws 188 are attached to arms 184 which in turn rotate on pins 182 attached to extractor assembly 160 through a slot 180 into which pins 182 are inserted. Extractor jaws 188 are activated, to either engage or release extruded object 9, by pneumatic cylinders 186, causing extractor jaws 188, extractor arms 184 and pins 182 to rotate about slot 180. FIG. 10 is a top view of the extractor assembly showing the relation of the extractor jaws 188, pneumatic cylinder attachment pins 190, pneumatic cylinders 186, extractor arms 184, pins 182 and slots 180.

Figure 12:
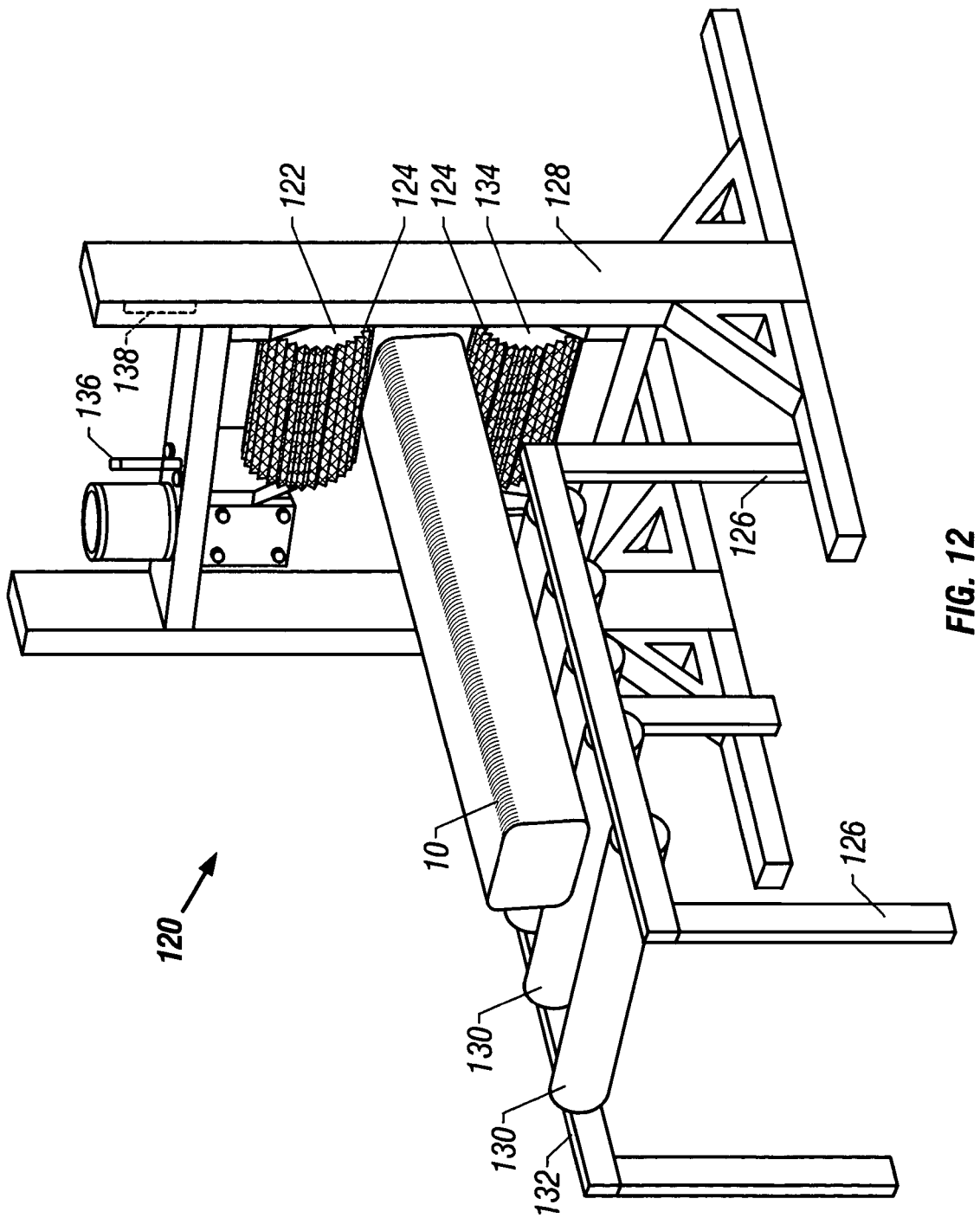
FIG. 12 illustrates in an elevated pictorial view an apparatus which can be used to provide texturing of an object in accordance with an embodiment of the invention.

Referring now to FIG. 12, another very important feature of the invention is illustrated and described. Railroad crossties provide a key element of railroad track roadbeds, carrying the load imposed by the train wheels on the steel rails and distributing it across the stone ballast and foundation below. Among the forces exerted on the crossties is a lateral or centripetal force caused by the train traveling around a curve or rocking side-to-side on a straight section of track. The crossties must resist this force by means of friction against the ballast that is compacted below and around the ties.

The traditional wood tie is soft and rough surfaced enough to allow some penetration by the hard and sharp-edged stone ballast. The resulting adhesion between wood and stone provides resistance to displacement in service (or in the "single-tie push test" used by the railroad industry to measure the friction), thereby improving the lateral strength of the track structure.

Steel ties are hollow and are designed to sink down in to the ballast to achieve the same result. Concrete ties rely on their heavy weight (over 700 pounds versus 200–270 for wood and composite ties) and a shaped profile to increase friction.

In the case of plastic and composite ties, the requirement for lateral push stability or increased friction with the ballast is more difficult to achieve. In the case of profile extruded or continuously molded composite ties, the cross-section is constant and the forming process generates a smooth surface. It is not possible to produce grooves or impressions perpendicular to the long axis of the tie (i.e., perpendicular to the direction of extrusion or mold withdrawal). The smooth composite tie may not provide sufficient friction to achieve a solid and stable track structure, particularly in curves under heavy loads.

When the tie contains an appreciable amount of thermoplastic or elastomeric material in its composition, however, the finished tie can be modified by heat and pressure to provide a solution. The bottom and/or sides of the tie can be textured by applying an embossing pattern under heat and pressure to melt, deform into a desired surface and then reharden the thermoplastic surfaces of the tie.

The embossed texture, or pattern, should preferably have certain properties to provide effective friction with a rock ballast system.
a. Indentations at least 1/8" deep.
b. Indentations should provide surfaces perpendicular to the longitudinal (long) axis of the tie.
c. Indentations should be at least 1/4" wide and less than 6" wide.
d. Pattern should provide corners or holes to capture and hold individual pieces of ballast.
e. Indentations should provide resistance to force across at least 10% of crosstie surface.

The texturing can be achieved in three ways;
1. Cold rolling or pressing the tie while the surface is still soft and malleable.
2. Press the pattern into the tie with heated rollers at a temperature sufficient to permanently deform the surface.
3. Press the pattern into the tie with heated plates at a temperature sufficient to permanently deform the surface.

In FIG. 12 includes, in general, a texturer 120, an upper roller 122, a pair of roller surfaces, a roller support member 128, a table 132, a conveyer 130, a lower roller 134, a heated fluid input 136 and a table support member 126.

In FIG. 12, table 132 supports extruded object 10. Conveyer 130 on the upper surface of table 132 facilitates the movement of the extruded object 10 towards the upper and lower rollers 122 and 134. Hot oil is circulated via hot fluid input 136, through upper roller 122 and lower roller 134 to raise the temperature of upper roller 122 and lower roller 134. Upper roller 122 and lower roller 134 are oriented relative to each other such that as the extruded object 10 is passed between the rollers causing the two roller surfaces 124 to impress a permanent texture into the surface of extruded object 10.

Thus, the apparatus of FIG. 12 achieves the object of having indentations running perpendicular to the longitudinal axis of the object, typically a railway crosstie.

If desired, the pair of rollers 122 and 134 can be replaced with a single roller. Alternatively, the roller or rollers can be replaced with one or more heated plates (not illustrated) to create the textured indentations.

The invention claimed is:

1. An apparatus comprising:
a mold having at least one side wall defining an interior portion, said mold having an opening for injecting material into said interior portion;
a member in sealable connection with said interior portion for adjustably controlling the density of the material; and
said member further comprising;
a piston capable of sliding at variable speed along said interior portion for controlling the density of the material; and
a combination of at least one gear and at least one brake, wherein said combination engages said piston for adjustably controlling the density of the material.

2. The apparatus of claim 1, wherein said controlling member comprises a backpressure piston.

3. The apparatus of claim 1, further comprising a valve positioned upstream from said mold, said valve further actuating to allow flow when said mold is empty or block flow when said mold is full.

4. The apparatus of claim 1, further having said mold with at least one end confining said interior portion, wherein said end further comprises a rod, slidingly connected therefrom.

5. The apparatus of claim 4, wherein said rod is pushed outwardly as the mold fills, whereby the outward end position of said rod is detected by a sensor as said mold is filled or substantially filled, said sensor further actuating said valve.

6. The apparatus of claim 1, further comprising a means to shut off the flow of the injected material when said mold is filled or substantially filled and a means to divert the material to another mold that is not filled.

7. The apparatus of claim 6, wherein said means comprises a diverter valve.

8. The apparatus of claim 7, wherein said means further comprises a first diverter station and a second diverter station.

9. The apparatus of claim 1, further comprising:
a means to shut off the flow of the injected material when said mold is filled or substantially filled.

* * * * *